(12) United States Patent
Popov et al.

(10) Patent No.: US 11,807,370 B2
(45) Date of Patent: Nov. 7, 2023

(54) AIRCRAFT EMERGENCY PARACHUTE DEPLOYMENT SYSTEM

(71) Applicants: Boris Popov, Stillwater, MN (US); Urik Popov, Stillwater, MN (US)

(72) Inventors: Boris Popov, Stillwater, MN (US); Urik Popov, Stillwater, MN (US)

(*) Notice: Subject to any disclaimer, the term of this patent is extended or adjusted under 35 U.S.C. 154(b) by 0 days.

(21) Appl. No.: 18/012,556

(22) PCT Filed: Jun. 23, 2021

(86) PCT No.: PCT/US2021/038782
§ 371 (c)(1),
(2) Date: Dec. 22, 2022

(87) PCT Pub. No.: WO2022/031377
PCT Pub. Date: Feb. 10, 2022

(65) Prior Publication Data
US 2023/0264821 A1    Aug. 24, 2023

Related U.S. Application Data

(60) Provisional application No. 63/042,938, filed on Jun. 23, 2020.

(51) Int. Cl.
*B64D 17/80*    (2006.01)
*B64D 17/72*    (2006.01)

(52) U.S. Cl.
CPC ........... *B64D 17/80* (2013.01); *B64D 17/725* (2013.01)

(58) Field of Classification Search
CPC .............................. B64D 17/80; B64D 17/725
See application file for complete search history.

(56) References Cited

U.S. PATENT DOCUMENTS

| | | | |
|---|---|---|---|
| 5,409,187 A * | 4/1995 | Dunham | B64D 17/725 102/340 |
| 6,682,017 B1 * | 1/2004 | Giannakopoulos | B64D 25/12 244/140 |
| 9,528,802 B1 * | 12/2016 | Markowitch | F42B 30/10 |
| 10,099,792 B1 * | 10/2018 | Swan | B64D 17/38 |
| 10,507,929 B1 * | 12/2019 | Vander Lind | B64D 17/725 |
| 11,015,907 B2 * | 5/2021 | Heiche | F42B 35/00 |
| 11,279,494 B2 * | 3/2022 | Sloman | F02K 9/00 |
| 2016/0280380 A1 * | 9/2016 | Fourie | B64D 1/12 |

(Continued)

OTHER PUBLICATIONS

United States Patent and Trademark Office; International Search Report for PCT/US21/38782; dated May 4, 2022; Alexandria, VA, USA.

(Continued)

*Primary Examiner* — Valentina Xavier (74) *Attorney, Agent, or Firm* — UNDERWOOD & ASSOCIATES, LLC (57) ABSTRACT

An aircraft emergency parachute deployment system (AEPDS) is disclosed. The AEPDS includes a parachute assembly coupled with an aircraft, a ballistic rocket assembly coupled to a top portion of the parachute assembly by a lanyard, an actuator for initiating launch of the ballistic rocket; and a control module configured to receive aircraft orientation measurements and controlling launch of the rocket when the spatial orientation the aircraft is within a pre-selected range of values.

16 Claims, 5 Drawing Sheets

(56) References Cited

U.S. PATENT DOCUMENTS

2017/0233086 A1* 8/2017 Homan ................... B64C 13/18
                                                    244/139
2018/0011487 A1* 1/2018 Robertson .............. B64D 45/00

OTHER PUBLICATIONS

United States Patent and Trademark Office; Written Opinion of the International Searching Authority for PCT/US21/38782; dated May 4, 2022; Alexandria, VA, USA.

* cited by examiner

AIRCRAFT EMERGENCY PARACHUTE DEPLOYMENT SYSTEM

CROSS REFERENCE TO RELATED APPLICATIONS

This application claims priority to and the benefit under 35 USC § 119(e) of U.S. Provisional Patent Application No. 63/042,938, filed on Jun. 23, 2020, the content of which is incorporated by reference in its entirety as if fully set forth herein.

TECHNICAL FIELD

This disclosure relates to emergency parachutes for use with aircraft. In particular, this disclosure relates to a aircraft emergency parachute deployment system utilizing a two-stage rocket configured to both extract an emergency parachute and slow or arrest the descent rate of a disabled aircraft in flight.

BACKGROUND

It is estimated that over 224,475 general aviation aircraft were active in 2011 (source: Aircraft Owners and Pilots Association, Frederick, MD), many of which are single- and twin-engine propeller-driven aircraft and smaller experimental aircraft that typically operate at lower altitudes. The future holds promise for even smaller, personalized craft (e.g., so-called "air-taxis" or vertical take-off and landing (VTOL) aircraft), manned or unmanned drones specifically configured for delivery of packages to homes and businesses, and small business/personal travel aircraft. It can be expected that the latter two craft types will operate at lower altitudes where minimum deployment time of an emergency parachute would be advantageous to reduce fatal accidents and property loss in the event of an emergency.

It is known in the field of aviation that the survivability of an aircraft emergency can be directly proportional to the altitude at which the emergency occurs, in that higher altitude provides more time to attend to the emergency. Emergencies can include, for example, collisions, loss of control, pilot incapacitation, engine loss or structural failure of an airframe. However, if such an incident occurs at a sufficient altitude to deploy a parachute (and the aircraft is so-equipped), the lives onboard the aircraft and on the ground below the falling aircraft may be spared or injuries may be reduced. Cirrus Aircraft is one aircraft manufacturer that has integrated, as standard equipment a deployable emergency parachute into all of its airframes and has saved close to eighty lives as a result. BRS Aerospace, located in Miami, Florida, USA, is a developer of ballistic aircraft parachutes, have contributed to saving 446 lives to date in various aircraft; U.S. Pat. No. 4,607,814, filed on Oct. 13, 1983 describes a ballistic parachute system for the such purposes.

Surviving an aircraft emergency equipped with an emergency parachute is highly dependent on the altitude at which the parachute is deployed and, equally important, how fast the parachute comes to full deployment to slow the aircraft's rate of descent. An aircraft experiencing a catastrophic airframe failure at 10,000 feet above ground level (AGL), for example, may have time on the order of minutes to utilize an emergency parachute, whereas the same aircraft at 500 feet AGL may have only seconds before impacting terrain. The size, weight, speed, and type of aircraft are all parameters that affect performance of an emergency parachute.

Single-stage rockets have been used to deploy parachutes from storage compartments on military and civilian aircraft. However, it is believed that these systems are only configured to rapidly extract the parachute. A rocket configured to extract an emergency parachute and slow the descent rate of a plummeting aircraft could require significant fuel stores. It is estimated that to slow 1500 pound aircraft, a rocket would require 3000 foot-pounds of thrust; a rocket producing such an impulse near an aircraft would present a serious hazard to its occupants even from acoustic energy alone. Furthermore, such an impulse could produce forces significant enough to inflict damage to the airframe, especially for smaller craft.

Accordingly, a rocket-driven, emergency parachute system for aircraft capable of rapidly extracting a parachute and safely slowing the descent rate of an incapacitated aircraft is an unmet need in the art of commercial, military, and civilian aviation.

SUMMARY

In general, an aircraft emergency parachute deployment system (AEPDS) for use in aircraft emergencies is disclosed. In one non-limiting embodiment, the AEPDS includes a deployable parachute assembly having parachute bridles configured to be attached to an airframe. The AEPDS further includes a two-stage ballistic rocket configured to: 1) extract an emergency parachute from a stored configuration from an airframe; and 2) slow or arrest the rate of descent of an incapacitated aircraft.

In one embodiment, the AEPDS is configured to receive aircraft orientation sensor measurements and launch the ballistic rocket within a range of predefined orientation parameters using an electronic control module, even if the pilot activates the AEPDS while the orientation of the aircraft is outside of the predefined orientation parameters.

In one embodiment, the rocket is configured to detach from the parachute assembly after the parachute has been deployed. Detachment can occur via use of a pyrotechnic fastener such as an explosive bolt. Relatedly, the rocket can be configured to detach after the control module senses that the rate of descent of the aircraft is within a pre-defined range, or if the aircraft has achieved a positive ascent rate via the impulse of the secondary rocket stage.

In a first general aspect, an aircraft emergency parachute deployment system ('system') is disclosed. The system includes an emergency parachute, including a parachute canopy, parachute lines connecting the canopy to the aircraft, and a lanyard having first and second ends, the first end attached to a top skin of the canopy. The system further includes a two-stage rocket assembly, including first and second rocket motor stages, the two-stage rocket assembly being connected to the second end of the lanyard. The first rocket motor stage is configured to provide a thrust-to-weight ratio greater than one when considering the weight of the two-stage rocket assembly, the lanyard, the parachute canopy and the parachute lines. The second rocket motor stage is configured to provide a thrust-to-weight ratio greater than one when considering the weight of the aircraft.

In one embodiment, the system further includes a control module operatively configured for determining an orientation of the aircraft in three-dimensional space in signal communication with an automatic deployment system configured to activate launch of the two-stage rocket assembly. The control module can be configured for signal communication with an inertial measurement unit configured to measure the aircraft orientation. The control module can be configured to generate a launch signal when the orientation of the aircraft is within predetermined parameters of three-dimensional space. The control module can prevent launch of the two-stage rocket assembly unless the aircraft is in an orientation such that the two-stage rocket assembly would launch in an upward direction, opposite to the direction of Earth.

In one embodiment, the first rocket motor stage is configured to provide a thrust-to-weight ratio of between 2 and 3, compensating for the gross weight of the two-stage rocket assembly, the lanyard, the parachute canopy and the parachute lines. The second rocket motor stage is configured to provide a thrust-to-weight ratio of between 2 and 3, compensating for the gross weight of the aircraft.

In one embodiment, the second rocket motor stage is configured to provide a thrust-to-weight ratio sufficient to slow or arrest a freefall of the aircraft.

The aircraft emergency parachute deployment system can further include a pyrotechnic fastener configured to receive the second end of the lanyard, and further configured to disengage from the two-stage rocket assembly after the parachute has been deployed from the aircraft. In a related embodiment, the two-stage rocket assembly further includes a delay grain disposed between the pyrotechnic fastener and the second stage rocket motor that causes ignition of an explosive charge after a predetermined amount of time, thereby disengaging the pyrotechnic fastener from the two-stage rocket assembly.

In one embodiment, the system further includes a control module operatively configured to receive signals from one or more instruments integral to the aircraft in signal communication with an automatic deployment system configured to activate launch of the two-stage rocket assembly. In a related embodiment, the control module can be configured to generate a launch signal to the automatic deployment system if the aircraft exceeds a predetermined threshold of one or more of: descent rate, g-force, loss of power or turn rate within a predetermined distance from ground.

In one embodiment, the system further includes a control module operatively configured to receive signals from one or more human physiological sensors, in signal communication with an automatic deployment system configured to activate launch of the two-stage rocket assembly.

In one embodiment, the two-stage rocket includes a delay grain between the first stage rocket motor and the second stage rocket motor that delays ignition of the second stage rocket motor for a predetermined amount of time after ignition of the first stage rocket motor.

The system can further include three or more exhaust nozzles integral with the second stage rocket motor that are configured to vent rocket exhaust at an angle to the long axis of the two-stage rocket assembly.

The system can be configured to be activated manually or autonomously.

In a second general aspect, an aircraft emergency parachute deployment system includes a two-stage rocket assembly configured to extract an emergency parachute from an aircraft during a first stage rocket burn and slow or arrest descent of the aircraft during a second stage rocket burn. The two-stage rocket assembly remains tethered to the aircraft via a lanyard connected to a top portion of the emergency parachute until the second stage rocket burn has completed.

In one embodiment, the first stage rocket burn produces a thrust sufficient to launch the two-stage rocket assembly and the parachute from the aircraft; and the second stage rocket burn produces a thrust sufficient to overcome the weight of the aircraft to slow or arrest descent of the aircraft.

In one embodiment, the two-stage rocket assembly is configured to launch manually or autonomously through the use of an electronic control module in signal communication with one or more aircraft instruments.

In one embodiment, launch of the two-stage rocket assembly is controlled by a control module in signal communication with one or more aircraft instruments, and wherein the launch is controlled such that the two-stage rocket assembly is activated only when the orientation of the aircraft is within a predetermined limits of three-dimensional space.

In a third general aspect, a method for deploying an emergency aircraft parachute includes providing the aircraft emergency parachute deployment system according to the first or second general aspect described above, configuring an electronic control module to be in signal communication with aircraft instruments or a stand-alone inertial measurement, so that the electronic control module is capable of determining an orientation of the aircraft relative to Earth, determining the boundaries of a three-dimensional safety space relative to the aircraft into which the two-stage rocket assembly can be safely launched, and configuring the control module to control launch of the two-stage rocket assembly only when the aircraft is in an orientation such that the two-stage rocket can be launched into the three-dimensional safety space.

Certain advantages of the systems and methods described herein include the rapid deceleration of a descending aircraft in emergency and deployment of an emergency parachute capable of minimizing the likelihood of injury or death; a control module that controls the launch of the rocket and parachute system along a trajectory that minimizes the likelihood of entanglement with the aircraft (e.g., controlling the firing of the rocket and parachute system such that it is launched upward, even when the aircraft is tumbling or spiraling); a two-stage rocket wherein the first stage extracts the parachute and the second, larger-impulse stage fires at a distance from the aircraft, reducing the likelihood of acoustic or thermal energy injuries to the occupants of the aircraft; among others.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

An aircraft emergency parachute deployment system (AEPDS) is disclosed. An AEPDS of the type described herein can be used to mitigate aircraft emergencies such as engine or airframe failure, collisions, or other emergencies, and can be particularly beneficial in low altitude and/or zero- or low forward-velocity flight configurations. An AEPDS can include, inter alia, an on-board, two-stage ballistic rocket (hereinafter 'rocket'), actuatable by a pilot, crew, other person, or automatically that is operable to extract and, in some cases, assist in deploying, manually or autonomously, an on-board parachute or other descent-limiting article connected to the aircraft. Such a parachute may be of the round, square or elliptical types, wherein the latter two types may afford pilot-activated or autonomous steering capability.

In general, the rocket is tethered to the aircraft through connection with the parachute. A first stage of the ballistic rocket provides a lower impulse than the second stage. The first stage is configured to both launch the ballistic rocket from the aircraft and extract the emergency parachute. The second, higher-impulse stage of the rocket is configured to fire after the rocket has traveled a distance from the aircraft and is configured to provide an impulse sufficient to slow the descent of the still-tethered aircraft. After the second-stage impulse, the rocket disconnects from the parachute, allowing the aircraft to safely descend under canopy.

In general, the parachute can be stored in a space-minimizing configuration within a compartment of the aircraft during normal aircraft use. The rocket can be tethered to a top portion of the parachute, for example, using a lanyard, such that when the rocket is launched from the aircraft, it pulls the parachute from its stowed configuration and extracts it into at least a partially-deployed configuration. As described in greater detail below, the AEPDS can utilize sensors to measure aircraft orientation factors such as pitch, roll and yaw, speed sensors, and other measurements to determine an optimal aircraft orientation to launch the rocket. In most cases, the preferred orientation of the aircraft will be one in which the rocket is launched upward, in the opposite direction that an aircraft is falling or descending.

It should be understood that the parachute may be partially inflated upon being extracted and continue to inflate as the falling aircraft descends downward, until fully inflated. In general, the AEPDS can assist in returning the aircraft from an uncontrolled freefall to a coordinated flight configuration (e.g., wings substantially level and nose/tail substantially parallel to the ground, for which the parameters thereof may vary by aircraft type) even if there is no, or minimal forward velocity, and maintain the aircraft at a zero or minimal descent rate.

Aircraft emergencies occurring at low altitude can benefit not only from rapid parachute extraction but also a 'lifting' force sufficient to counteract or overcome the aircraft's descent. Accordingly, the rocket of an AEPDS can be configured to have an impulse power sufficient to overcome the gravitational pull on the aircraft and provide a positive ascent rate to the aircraft, even if only briefly.

In one non-limiting example, an AEPDS can utilize a two-stage rocket having a primary propellant fuel grain that is ignited first, upon actuation of the AEPDS, and is configured to both launch the rocket itself from the aircraft and extract the parachute. The rocket can further include a larger, secondary fuel grain that is configured to be ignited after the primary grain and is further configured having an appropriate thrust-to-weight ratio to slow or arrest free-fall of the aircraft. Because the secondary grain of the rocket is ignited away from the aircraft, the danger of the larger impulse to occupants is reduced. In general, a thrust-to-weight ratio is an indicator of a rocket's acceleration expressed in multiples of gravitational acceleration (g). Generally speaking, for example, the first stage rocket can be configured to launch with a positive thrust-to-weight ratio if the thrust produced (as determined by the configuration of the rocket itself and the fuel) is sufficient to overcome the combined weight of the entire rocket assembly, and also including the parachute assembly.

Referring now to FIGS. 1A-1E, a deployment sequence of an AEPDS 100 on an "Air Taxi" aircraft is illustrated according to one embodiment. It should be understood that the air taxi shown in the drawings is intended to be illustrative of any aircraft type and is not so-limited to smaller aircraft.

In this embodiment, the AEPDS 100 includes a ballistic rocket 105 coupled to a parachute 150 via lanyard 130. (In FIG. 1A, parachute 150 is contained within a deployment container 115.) Parachute 150 is connected to the airframe of the air taxi via parachute lines 120. Prior to activation, the rocket 105 and parachute 150 (including lanyard 130 and parachute lines 120) of the AEPDS 100 can be compactly stowed in an airframe compartment such that both components of the AEPDS can be launched therefrom. Deployment container 115 can serve the dual purpose of protecting parachute 150 while in storage and also to aid in facilitating a clean, untangled parachute deployment.

In this embodiment, the air taxi—like almost all aircraft—is outfitted with one or more sensors capable of measuring the speed and orientation of the aircraft (not shown in the figures). The one or more sensors can be those that are integral with the aircraft, i.e., instruments used in the normal piloting of the craft, e.g., altimeter, airspeed indicator, vertical speed indicator, altimeter, heading indicator (compass), gyroscopic turn coordinator, etc.; or separate, extrinsic sensors specifically configured for use with the AEPDS 100.

In this embodiment, the AEPDS 100 can include one or more activation mechanisms, such as an activation handle, button or other manually-operated device that is configured to activate the AEPDS 100. "Activating" the AEPDS 100 is intended to mean initiating emergency parachute deployment by firing ballistic rocket 105. Alternatively, in this and other embodiments, the AEPDS 100 can be automatically activated by an electronic control module configured to receive measurements from the one or more sensors and launch the rocket 105 when certain pre-configured parameters have been met, such as by sensing a rapid loss of altitude, loss of control, engine failure, a shock to the airframe (as in a collision), pilot incapacitation or other parameters.

Exemplary sensors include, but are not limited to: gyroscopes, accelerometers, air speed sensors, altimeters, engine sensors, and sensors configured to measure the continuity or structural soundness of the airframe. Other exemplary and applicable sensors include those configured to monitor non-aircraft parameters, such as vital signs of a pilot (heart or respiration rate, blood oxygen saturation, etc.). The control module of the AEPDS 100 can be configured to activate, e.g., by launching rocket 105 according to aircraft sensor data, non-aircraft sensor data, or a combination thereof.

For example, the control module can be configured to fire rocket 105 upon receiving sensor data from a medical monitor that indicates the pilot is experiencing a heart attack; additionally, the control module can be configured to fire rocket 105 upon receiving signals that the pilot is experiencing a heart attack and the aircraft has begun a rapid descent or is flying outside of normal operating ranges (e.g., an uncontrolled descent, spiraling, etc.). In one embodiment, an override control can be placed in a location accessible to the pilot that prevents AEPDS 100 from firing rocket 105.

In this embodiment, when a pilot triggers the one or more activation mechanisms, such as by pulling an emergency handle, pressing a button or other mechanism, an AEPDS control module can determine the attitude (orientation) of the aircraft and fire the rocket 105 within a pre-set, optimal range of aircraft orientations. For example, the AEPDS can utilize an electronic, 6-axis inertial measurement unit (IMU) to determine if the aircraft is tumbling and control the launch of the rocket only when the aircraft is within a certain pitch, roll, or combination of pitch and roll ranges, thereby defining a safe "firing cone" range. This can ensure that the parachute is not fired downward, for example, which could lead to entanglement of the aircraft with the parachute. An IMU of an AEPDS 100 can include, for example, an accelerometer, gyroscope and magnetic field sensor, each of which can be in signal communication with a microcontroller such as a dsPIC® digital signal controller provided by Microchip, Chandler, Ariz., USA.

Figure 3:
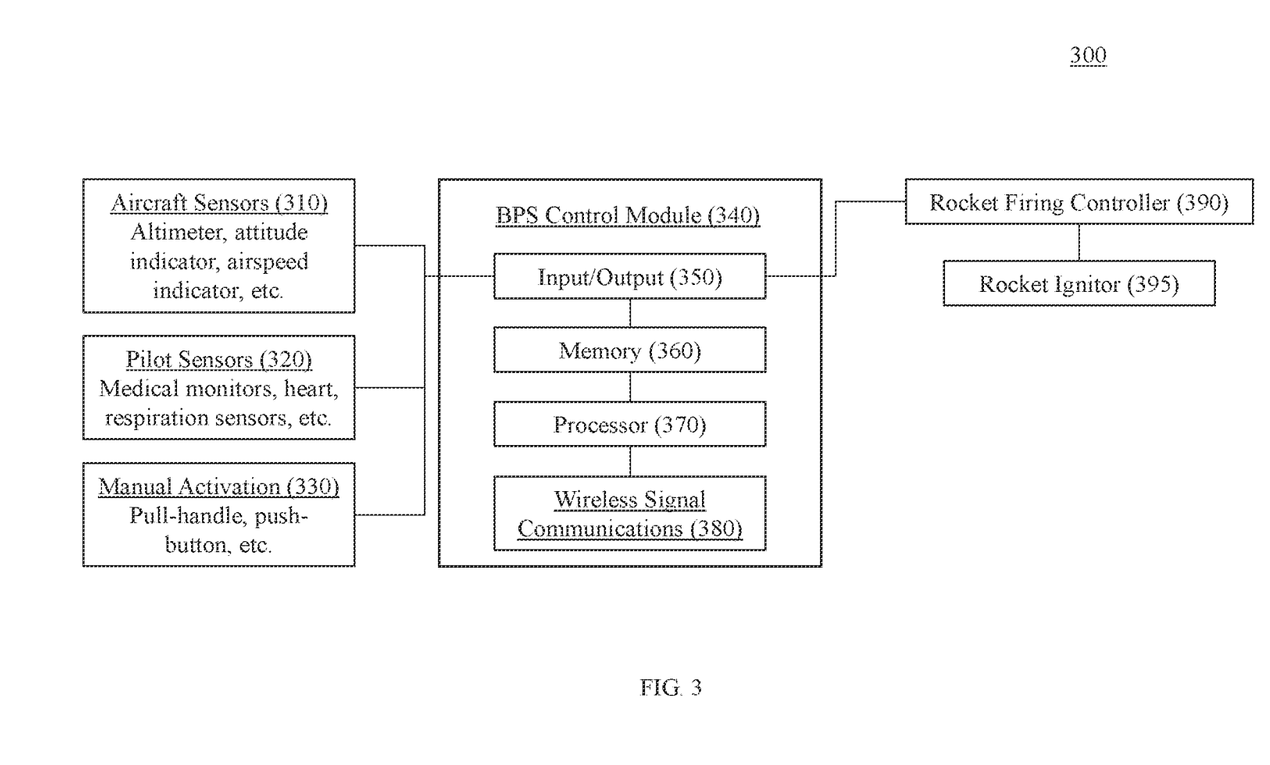
FIG. 3 is a schematic illustration of a control module according to one embodiment.

FIG. 3 is a diagrammatic illustration 300 of an AEPDS according to one embodiment. In this embodiment, the AEPDS includes aircraft sensors 310 which can be any type of sensor or instrument used in aircraft, including a shock sensor configured to detect a collision; pilot sensors 320 which can be any type of sensor or instrument used for monitoring the health of a pilot, the environment of the cockpit (e.g., an oxygen or carbon monoxide detector); and a manual activation control 330 which can be, e.g., a pull-handle, push-button or any other actuatable device configured to activate the AEPDS.

In this embodiment, an AEPDS control module 340 includes, inter alia, input/output hardware (350) configured for signal communication with the aircraft sensors 310, pilot sensors 320, manual activation control 330 and other peripherals, sensors, actuators and the like. The control module 340 further includes a memory 360 and a processor 370 which can cooperatively communicate to carry out functions of an AEPDS as described herein. For example, memory 360 can, inter alia, store software instructions for interpreting sensor and actuator data from the aircraft and firing the ballistic rocket to deploy the emergency parachute. Processor 370 can be configured, inter alia, to analyze aircraft instruments, sensors and other data so as to optimally fire the rocket that deploys the emergency parachute. For example, if an aircraft is incapacitated and tumbling or spinning out of control, processor 370 can take, as input, attitude, pitch, yaw, altitude, and other sensor/instrument information from the aircraft sensors and calculate an optimum moment to fire the rocket so that the rocket is propelled upward, i.e., in the opposite direction from the ground. Wireless signal communications module 380 is configured for bi-directional signal communication with the rocket as described herein.

In this embodiment, the I/O module 350 of the AEPDS control module 340 is in signal communication with rocket firing controller 390. The rocket firing controller 390 itself sends a signal to the rocket ignitor 395 which, in turn, activates and launches the rocket. The rocket firing controller 390 can be configured to generate an appropriate signal to the rocket ignitor 395 when and if control module 340 determines an emergency exists and the emergency parachute should be deployed.

Figure 1A:
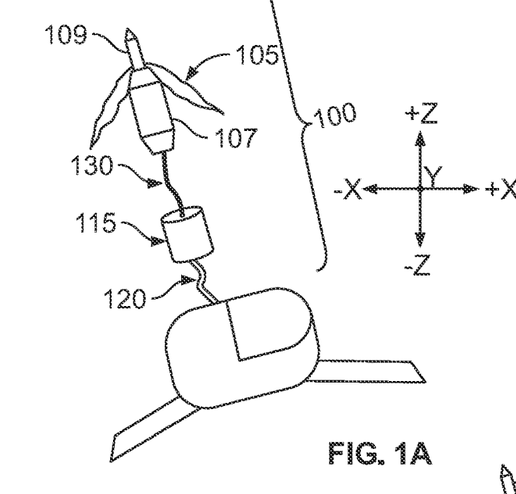
FIG. 1A illustrates a first-stage deployment of a aircraft emergency parachute deployment system (AEPDS) according to one embodiment.

Referring now in particular to FIG. 1A, the illustration shows the AEPDS 100 having just been activated. In this embodiment, the rocket 105 includes a first stage 109 having a primary fuel grain therein sufficient to extract the rocket 105 itself and the parachute 150 (which in this embodiment is compactly contained within deployment container 115), including lanyard 130 and parachute lines 120. As illustrated, the AEPDS 100 was launched with the air taxi in a slight roll about the y-axis. After AEPDS activation, the primary stage 109 of the rocket 105 may continue to burn for a preset amount of time sufficient to fully extract the parachute 105 (FIG. 1B), such that lanyard 130 and the parachute lines 120 are maximally extended. The amount of time that the primary stage burns can be a function of the amount of rocket fuel contained within the primary stage. In other words, the primary stage can be configured to burn until the fuel is exhausted.

Figure 1B:
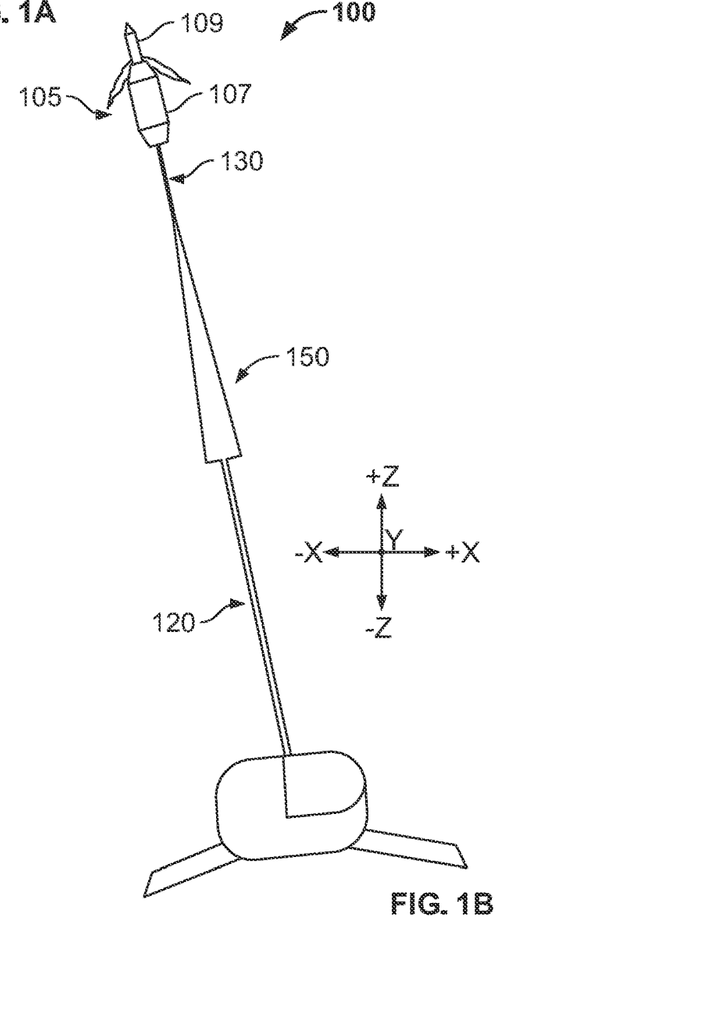
FIG. 1B illustrates first-stage deployment of an AEPDS according to one embodiment, wherein parachute lines attain a full-stretch configuration.
Figures 1C, 1D:
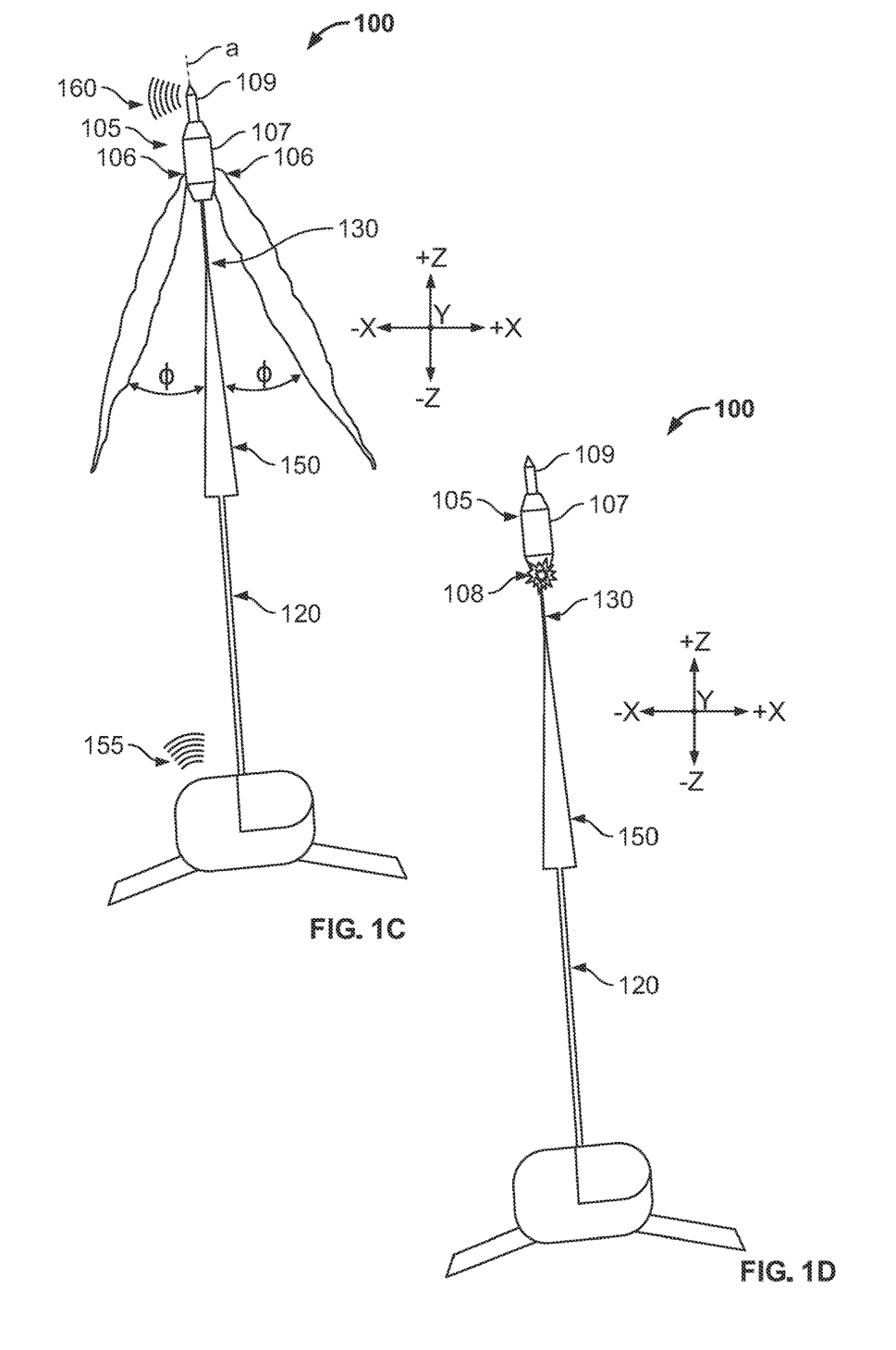
FIG. 1C illustrates a second-stage rocking firing during deployment of an AEPDS according to one embodiment.
FIG. 1D illustrates firing of an explosive bolt of an AEPDS according to one embodiment.

Next, referring to FIG. 1C, the secondary stage 107 of rocket 105 can be fired. In this embodiment, the secondary stage 107 is configured to provide a larger impulse than the primary rocket stage 109 and can provide sufficient upward thrust to correct the attitude of the aircraft toward a zero-pitch, zero-roll configuration and, in some embodiments, arrest the descent rate of the aircraft or provide lift to the aircraft to provide a positive ascent rate. Ignition of the secondary stage can be controlled, for example, by a delay grain that is ignited concurrently with the primary stage.

In an alternative embodiment, the rocket 105 can include a switch, release, tension monitor, activation or other mechanically-linked mechanism that causes the secondary stage 107 of rocket 105 to fire when a threshold tension between the rocket 105 and the aircraft is achieved, e.g., when lanyard 130, parachute 150 and parachute lines 120 become taught and maximally extended, e.g., as illustrated in FIG. 1B. For example, a release pin (not illustrated in the figures) can be extracted from the rocket body by a separate extraction lanyard when lanyard 130, parachute 150 and parachute lines 120 become taught, as illustrated in FIG. 1B. Such a configuration can reduce the time lag for ignition of the secondary stage after the primary stage, as it is dependent on the lanyard 130, parachute 150 and parachute lines 120 becoming taught versus the burn time of the delay grain.

The amount of time that the secondary stage 107 burns can be controlled by the available fuel stored within the secondary stage; or, in an alternative embodiment, by a rocket control module within the rocket 105 that is configured to receive signals from a control module on the aircraft, e.g., control module 340 described with respect to FIG. 3. For example, the rocket control module can include a receiver configured to receive signals from the aircraft control module according to a uni- or bi-directional signal communication protocol (RF, WIFI, Bluetooth, etc.) as illustrated by signals 155 and 160. In one approach, the control module of the AEPDS 100 can monitor the one or more sensors to determine if the aircraft is in a substantially level orientation, as illustrated in FIG. 1C and, in some embodiments, to determine if a zero descent, or positive ascent rate has been achieved. If such parameters have been met, the aircraft control module can send a 'kill' signal to the rocket control module. Upon receiving such a signal, the rocket control module can engender the cessation of the secondary burn through, e.g., closing a valve that limits the amount of air into the combustion chamber (as in a hybrid rocket), changing a nozzle geometry or other rocket parameter, or by causing the rocket 105 to disconnect from the lanyard 130 as explained in greater detail below.

Still referring to FIG. 1C, in this and other embodiments, the output ports 106 (or nozzles) of rocket 105 are be configured so that the venting heat and gasses are expelled at an angle θ to the long axis α of the rocket 105. Such a configuration can protect the parachute 150 from being damaged by exposure to the rocket output. For the same reason, and to also prevent damage to other elements of the AEPDS 100, e.g., lanyard 130, parachute lines 120, it can be advantageous to activate the second stage of the rocket 105 when the lanyard 130, parachute 150 and parachute lines 120 become taught and maximally extended as illustrated.

Figure 2:
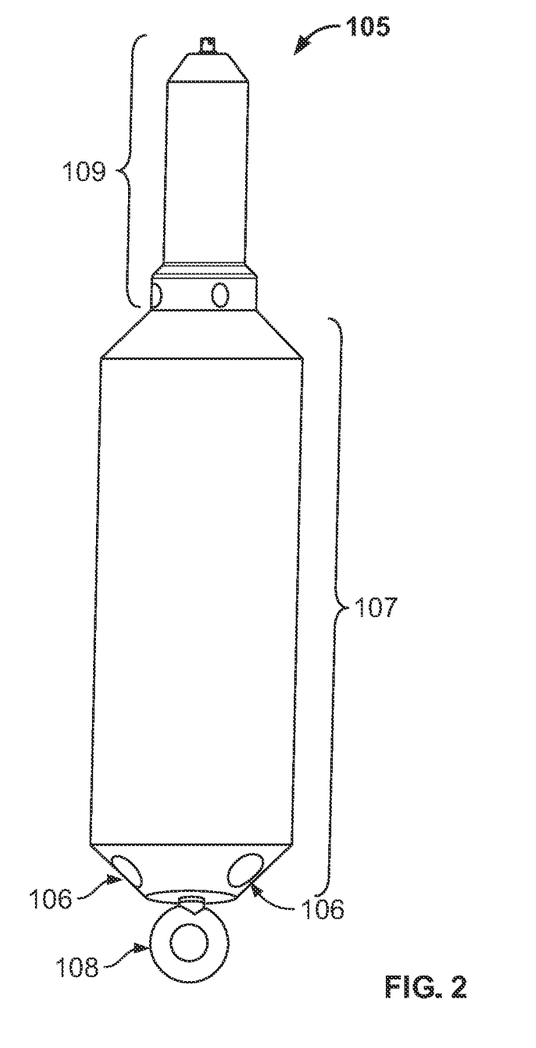
FIG. 2 illustrates a two-stage ballistic rocket of an AEPDS according to one embodiment.

Next, referring to FIG. 1D and FIG. 2, rocket 105 can be configured to detach from lanyard 130. Detachment of the rocket 105 from lanyard 130 can occur when the secondary stage burn is complete or, if other burn control means are utilized, when a kill signal or other burn sequence occurs, after a preselected time, through the use of a delay grain or by other means.

In one non-limiting example, detachment of the rocket 105 from lanyard 130 can be achieved through the use of a pyrotechnic fastener, such as an explosive bolt, the eyelet 108 of which is visible in FIG. 2. (It should be understood that other components of the explosive bolt 108 are within the secondary stage 109 and not illustrated in FIG. 2 for the sake of figure clarity.) The explosive bolt can be activated, e.g., through the use of a delay grain or an electronic timer that is configured to send an electronic current to the explosive charge within the explosive bolt after a certain amount of time, e.g., 2 seconds, 4 seconds, etc.

After the pyrotechnic fastener has been activated, the rocket 105 can fall away, so as not to land on the parachute or aircraft, potentially causing damage or injury. An optional lanyard, running between the aircraft, e.g., the tail section, and rocket can be utilized to prevent the rocket from causing terrestrial injury or damage. Alternatively, rocket 105 can be outfitted with its own parachute that is configured to deploy after the pyrotechnic fastener has been activated or after a selected amount of time therefrom.

Figure 1E:
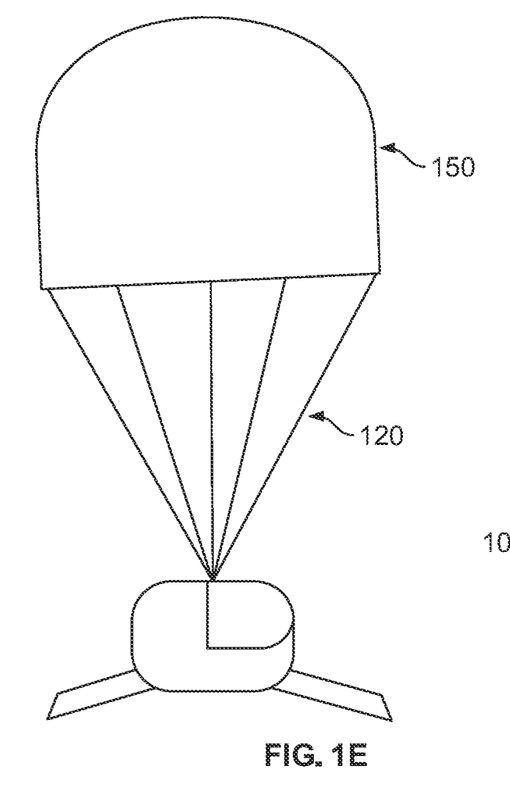
FIG. 1E illustrates an aircraft safely descending under canopy.

Referring to FIG. 1E, parachute 150 of the AEPDS 100 is shown fully inflated and controlling the descent of the aircraft back to earth. To achieve rapid deployment, the parachute 150 can be packed according to known methods. In cases where the AEPDS 100 utilizes a round-style parachute, the parachute lines 120 can be attached to the aircraft either in a centralized area, e.g., at or near the aircraft center of gravity or, in an alternative embodiment, at multiple attachment points which may provide greater stability. In cases where the AEPDS 100 utilizes a square- or elliptical-style parachute, parachute steering toggles can be configured to be accessible to, and operably by the pilot. In this case, the pilot can, for example, attempt to steer the parachute to a safe landing area or avoid hazards such as power lines, buildings, bodies of water or other hazards.

In this and other embodiments, parachute 150 can be made from materials known in the parachuting and aerospace industries. In one embodiment, parachute 150 can include a heat-resistant top skin layer to reduce the likelihood of damage by the output of the rocket 105. In another embodiment, a heat-resistant protective shroud can be configured to cover the parachute as it deploys (e.g., as shown in FIGS. 1B-1D), and subsequently collapse when the main parachute is fully deployed (e.g., as shown in FIG. 1E), similar to the way in which tandem skydiving drogue parachutes are configured to collapse behind the main parachute after deployment.

Figure 4:
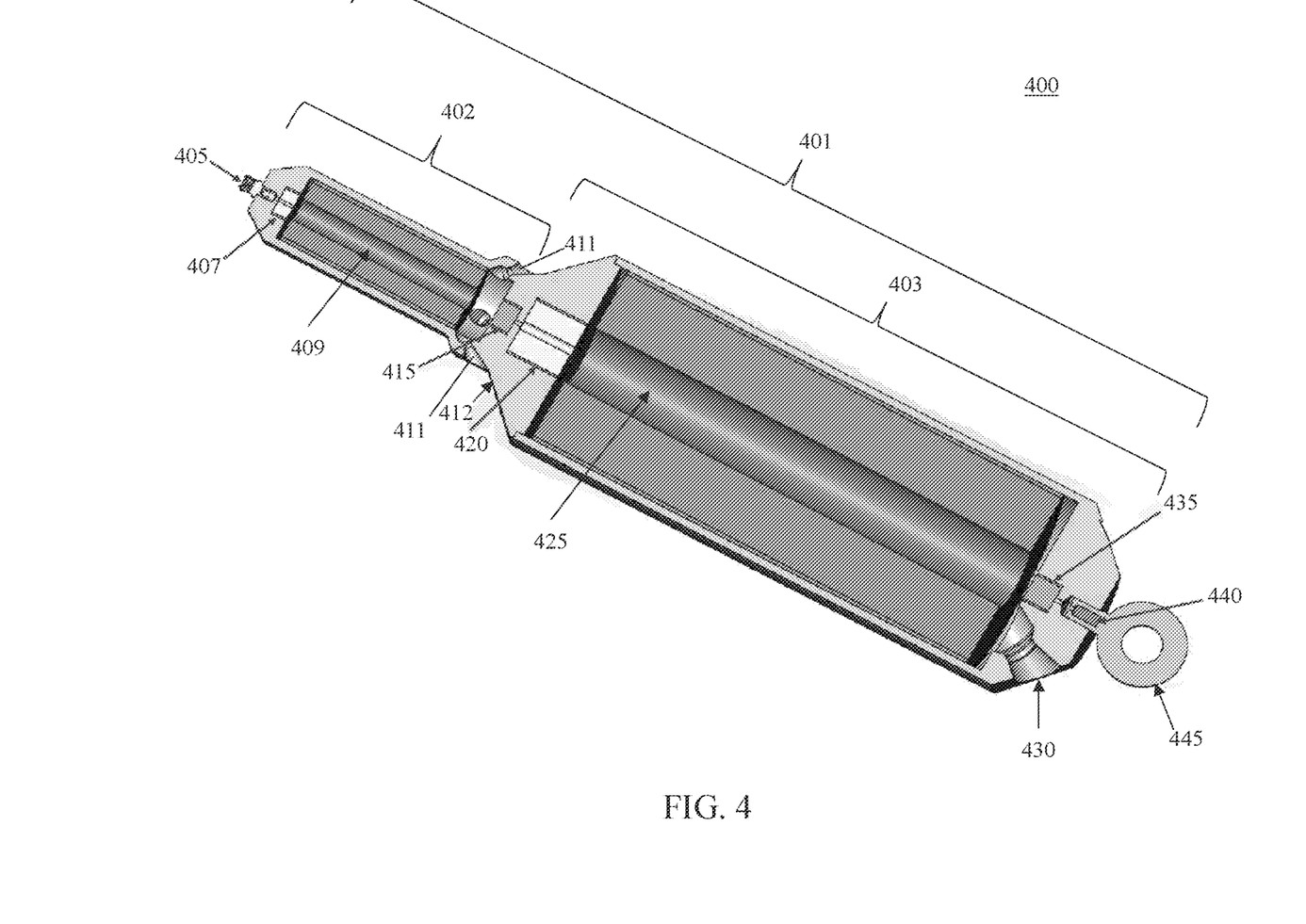
FIG. 4 illustrates features of a two-stage rocket assembly according to one embodiment.

Referring now to FIG. 4, a cross-sectional view of a rocket assembly 400 is illustrated according to one embodiment. The rocket assembly 400 can be used as the previously-described rocket 105 described herein.

In this embodiment, rocket assembly 400 includes a main housing 401. The main housing is divided into a first-stage motor 401 and a second-stage motor 402. The first-stage motor 401 is configured to provide enough power or thrust to extract the rocket assembly 400 and the emergency parachute from an aircraft as previously described herein. The first-stage motor 401 includes an electric initiator 405 that ignites a solid rocket fuel igniter 407.

The igniter 407 in turn ignites a main rocket fuel 409 which provides the impulse for the rocket assembly to launch from the aircraft and extract the emergency parachute. In this embodiment, the main rocket fuel 409 is a solid rocket propellant that burns within the first-stage motor 401. In this embodiment, the main rocket fuel 409 is approximately two inches in diameter and approximately six inches long; however, it should be understood that the amount of this first-stage fuel can be increased or decreased depending on pertinent factors such as overall rocket size, parachute size, etc.

In this embodiment, the exhaust from the burning rocket fuel is directed out of three nozzles 411 disposed between the first-stage motor 401 and the second-stage motor 402 as illustrated. (It should be understood that only two nozzles 411 are visible in the sectional view of FIG. 4.) The nozzles are disposed equidistant from one another so as to provide straight thrust parallel with, and along the long axis of the rocket assembly 400 when launched. A beveled upper portion 412 of the second-stage motor 403 deflects the hot exhaust of the first-stage motor 401 away from the rocket assembly 400. This configuration aids in protecting components of the parachute from being burned during extraction and deployment.

In this embodiment, a first delay grain 415 is ignited when the main rocket fuel 409 is ignited. The delay grain 415 acts as a timer for the ignition of the second-stage ignition grain 420. The delay grain 415 can be configured to delay the ignition of the second-stage ignition grain 420 by a predetermined time through appropriate choice of fuel type and size. The delay time can be chosen and optimized so that, for a particular aircraft, parachute assembly and rocket assembly, the second-stage ignition grain 420 is ignited after the extracted parachute lines are at full-stretch.

In this embodiment, the second-stage ignition grain 420 ignites the second-stage main fuel 425. The main fuel 425 can likewise be a solid-state rocket fuel that burns within the second-stage 402 and is exhausted out of exit nozzles 430. In this embodiment, there are three exit nozzles 430 (only one of which is visible in the sectional view of FIG. 4) symmetrically disposed equidistant from one another so as to provide a thrust parallel to, and along the long axis of the rocket assembly 400. In this embodiment, the nozzles are directed outwardly at an angle from the long axis of the rocket assembly 400 so as to reduce the likelihood of damaging the emergency parachute.

In this embodiment, a second delay grain 435 is ignited when the second-stage main fuel 425 is ignited. The second delay grain 435 delays the ignition of an explosive bolt lifting eye 440 that, when activated, causes the release of eyelet bolt 445 from the second-stage motor 402. In the embodiments of an AEPDS 100 described herein, eyelet bolt 445 is connected to the lanyard (lanyard 130 in FIGS. 1A-1D) that extracts the emergency parachute. The second delay grain 435 can be configured to ignite the explosive bolt lifting eye 440 after a predetermined time. In one example, the predetermined amount of time can be after the rocket assembly 400 has launched and the emergency parachute has been partially- or fully inflated. Accordingly, the explosive bolt assembly allows the rocket assembly 400 to disengage from the emergency parachute after deployment.

A number of illustrative embodiments have been described. Nevertheless, it will be understood that various modifications may be made without departing from the spirit and scope of the various embodiments presented herein. Accordingly, other embodiments are within the scope of the following claims.

What is claimed is:

1. An aircraft emergency parachute deployment system, comprising:
   an emergency parachute comprising:
      a parachute canopy, parachute lines connecting said canopy to said aircraft, and a lanyard having first and second ends, the first end attached to a top skin of said canopy; and
   a two-stage rocket assembly, comprising first and second rocket motor stages, said two-stage rocket assembly being connected to said second end of said lanyard;
   wherein said first rocket motor stage is configured to provide a thrust-to-weight ratio greater than one when considering the weight of said two-stage rocket assembly, said lanyard, said parachute canopy and said parachute lines; and
   wherein said second rocket motor stage is configured to provide a thrust-to-weight ratio greater than one when considering the weight of said aircraft.

2. The aircraft emergency parachute deployment system of claim 1, further comprising a control module operatively configured for determining an orientation of said aircraft in three-dimensional space in signal communication with an automatic deployment system configured to activate launch of said two-stage rocket assembly.

3. The aircraft emergency parachute deployment system of claim 2, wherein said control module is configured for signal communication with an inertial measurement unit configured to measure said aircraft orientation.

4. The aircraft emergency parachute deployment system of claim 2, wherein said control module is configured to generate a launch signal when the orientation of said aircraft is within predetermined parameters of three-dimensional space.

5. The aircraft emergency parachute deployment system of claim 2, wherein said control module prevents launch of said two-stage rocket assembly unless said aircraft is in an orientation such that said two-stage rocket assembly would launch in an upward direction, opposite to the direction of Earth.

6. The aircraft emergency parachute deployment system of claim 1, wherein:
   said first rocket motor stage is configured to provide a thrust-to-weight ratio of between 2 and 3, compensating for the gross weight of said two-stage rocket assembly, said lanyard, said parachute canopy and said parachute lines; and
   said second rocket motor stage is configured to provide a thrust-to-weight ratio of between 2 and 3, compensating for the gross weight of said aircraft.

7. The aircraft emergency parachute deployment system of claim 1, wherein said second rocket motor stage is configured to provide a thrust-to-weight ratio sufficient to slow or arrest a freefall of said aircraft.

8. The aircraft emergency parachute deployment system of claim 1, further comprising a pyrotechnic fastener configured to receive said second end of said lanyard, and further configured to disengage from said two-stage rocket assembly after said parachute has been deployed from said aircraft.

9. The aircraft emergency parachute deployment system of claim 8, wherein said two-stage rocket assembly further comprises a delay grain disposed between said pyrotechnic fastener and said second stage rocket motor that causes ignition of an explosive charge after a predetermined amount of time, thereby disengaging said pyrotechnic fastener from said two-stage rocket assembly.

10. The aircraft emergency parachute deployment system of claim 1, further comprising a control module operatively configured to receive signals from one or more instruments integral to said aircraft in signal communication with an automatic deployment system configured to activate launch of said two-stage rocket assembly.

11. The aircraft emergency parachute deployment system of claim 10, wherein said control module is configured to generate a launch signal to said automatic deployment system if the aircraft exceeds a predetermined threshold of one or more of: descent rate, g-force, loss of power or turn rate within a predetermined distance from ground.

12. The aircraft emergency parachute deployment system of claim 1, further comprising a control module operatively configured to receive signals from one or more human physiological sensors, in signal communication with an automatic deployment system configured to activate launch of said two-stage rocket assembly.

13. The aircraft emergency parachute deployment system of claim 1, wherein said two-stage rocket comprises a delay grain between said first stage rocket motor and said second stage rocket motor that delays ignition of said second stage rocket motor for a predetermined amount of time after ignition of said first stage rocket motor.

14. The aircraft emergency parachute deployment system of claim 1, further comprising three or more exhaust nozzles integral with said second stage rocket motor that are configured to vent rocket exhaust at an angle to the long axis of said two-stage rocket assembly.

15. The aircraft emergency parachute deployment system of claim 1, wherein said emergency parachute deployment system is configured to be activated manually or autonomously.

16. A method for deploying an emergency aircraft parachute, comprising:
   providing the aircraft emergency parachute deployment system according to claim 1;
   configuring an electronic control module to be in signal communication with aircraft instruments or a stand-alone inertial measurement, so that said electronic control module is capable of determining an orientation of said aircraft relative to Earth;

determining the boundaries of a three-dimensional safety space relative to said aircraft into which said two-stage rocket assembly can be safely launched; and configuring said control module to control launch of said two-stage rocket assembly only when said aircraft is in an orientation such that said two-stage rocket can be launched into said three-dimensional safety space.

* * * * *